United States Patent [19]

Lipo

[11] 4,137,489
[45] Jan. 30, 1979

[54] FEEDBACK CONTROL FOR REDUCTION OF COGGING TORQUE IN CONTROLLED CURRENT AC MOTOR DRIVES

[75] Inventor: Thomas A. Lipo, Schenectady, N.Y.

[73] Assignee: General Electric Company, Schenectady, N.Y.

[21] Appl. No.: 817,626

[22] Filed: Jul. 21, 1977

[51] Int. Cl.² .............................................. H02P 5/40
[52] U.S. Cl. ..................................... 318/798; 318/722
[58] Field of Search ........................ 318/227, 230, 231

[56] References Cited

U.S. PATENT DOCUMENTS

| 3,805,135 | 4/1974 | Blaschke | 318/227 |
|---|---|---|---|
| 3,824,437 | 7/1974 | Blaschke | 318/227 |
| 3,919,609 | 11/1975 | Klautschek et al. | 318/227 |
| 4,011,489 | 3/1977 | Franz et al. | 318/227 |
| 4,041,361 | 8/1977 | Cornell | 318/227 |
| 4,044,285 | 8/1977 | Plunkett et al. | 318/227 |

Primary Examiner—Gene Z. Rubinson
Attorney, Agent, or Firm—Donald R. Campbell; Joseph T. Cohen; Marvin Snyder

[57] ABSTRACT

A decogging feedback control for current source inverter motor drives uses a change of instantaneous torque feedback signal with no dc component that is a function of only the instantaneous pulsating component of measured torque. The change of torque signal modulates the voltage applied to the dc link and therefore the dc link current to materially reduce the detrimental cogging torque pulsations and stabilize the motor, and can be switched out at a low frequency above which it is not needed so that the motor can respond properly to rapid variations in torque.

9 Claims, 12 Drawing Figures

FEEDBACK CONTROL FOR REDUCTION OF COGGING TORQUE IN CONTROLLED CURRENT AC MOTOR DRIVES

BACKGROUND OF THE INVENTION

This invention relates to controlled current ac motor drives, and more particularly to a feedback control and method of substantially reducing the cogging torque produced by controlled current drive systems at low frequencies.

Many applications including traction drive systems require the precise regulation of motor torque. The development of current source or controlled current inverters, which supply rectangular non-sinusoidal currents to the motor windings, has resulted in efforts to apply this device to adjustable speed ac induction motor drives. One of the weaknesses of present control strategies is that the torque pulsations due to the harmonic or cogging component of electromagnetic torque can be severe at very low machine frequencies and result in instabilities and uneven running. For a six pulse, polyphase full wave bridge inverter, torque ripple occurs because of the presence of the sixth, twelfth, and eighteenth harmonic components in the non-sinusoidal motor current in addition to the fundamental motor frequency, which is the electrical equivalent of the mechanical speed (RPM) at which the shaft is rotating. The torque pulsations are especially troublesome upon starting up or when passing through zero speed to reverse the direction of rotation, and can be eliminated by modulating the dc link current fed to the inverter.

In practice, motor parameters vary with temperature and frequency so that actual real-time measurement of the pulsating torque and closed-loop feedback control is necessary for the precise regulation of torque rather than relying on open loop compensation. An open loop technique for small industrial drives is described in U.S. Pat No. 4,066,938 to F. G. Turnbull, entitled "Input Current Modulation to Reduce Torque Pulsations in Controlled Current Inverter Drives," and assigned to the same assignee as this invention. A closed loop technique for reducing torque ripple requiring the continuous calculation of actual torque from the sensed motor voltage and current is disclosed in U.S. Pat. No. 3,919,609 to Klautschek et al.; in this patent the actual torque developed by the machine is compared to a predetermined reference value and the error signal is used to modulate the dc link current in a corrective sense. One disadvantage with this approach is that in practice it may be required to regulate a motor parameter other than machine current by varying the dc link current magnitude; another is that it is preferable to be able to switch out the cogging torque reduction control at higher machine frequencies so that the machine can properly respond to torque pulsations caused, for instance, by a sudden change in load.

SUMMARY OF THE INVENTION

An improved method and control system for realizing a substantial reduction in the cogging torque produced by controlled current ac motor drives employs a change of instantaneous torque feedback signal, i.e., one that is a function of only the instantaneous pulsating component of motor torque and has no average torque or dc component, in a feedback loop to modulate the dc link current in a sense to eliminate the detrimental torque component. The controlled current motor drive, as is known, comprises a voltage converter such as a phase controlled rectifier or a chopper for applying a voltage of variable magnitude to the dc link, and a polyphase current source inverter having a variable frequency output with the dc link current magnitude. The change or torque feedback signal is provided as a correction term to the means for varying the voltage applied to the dc link by the voltage converter, and is summed with a command signal representing the desired value of a selected motor parameter to be controlled in a relatively slow response current level regulating loop and with a sensed value of the selected parameter. The selected parameter can be motor air gap flux or actual motor torque as well as dc link current.

Two different techniques for calculating the instantaneous pulsating component of torque are disclosed, one involving computing the feedback signal directly from the dc link current, the zero current intervals, and the instantaneous voltage across each open-circuited motor phase winding, and the other involving first computing the actual torque developed by the motor and then filtering to remove the average torque or dc component. An important feature of the invention is that the change of torque feedback signal is ordinarily switched out or disconnected at a predetermined low frequency above which the decogging feedback control is ineffective and is not needed. The motor can then respond properly to rapid changes in torque under normal running conditions, for instance to respond to step changes in load. The frequency response control for switching the change of the torque signal in and out automatically is responsive to the inverter switching frequency or another equivalent frequency. The control system and method are applicable to both induction drives and synchronous motor drives.

DESCRIPTION OF THE PREFERRED EMBODIMENTS

Figure 1:
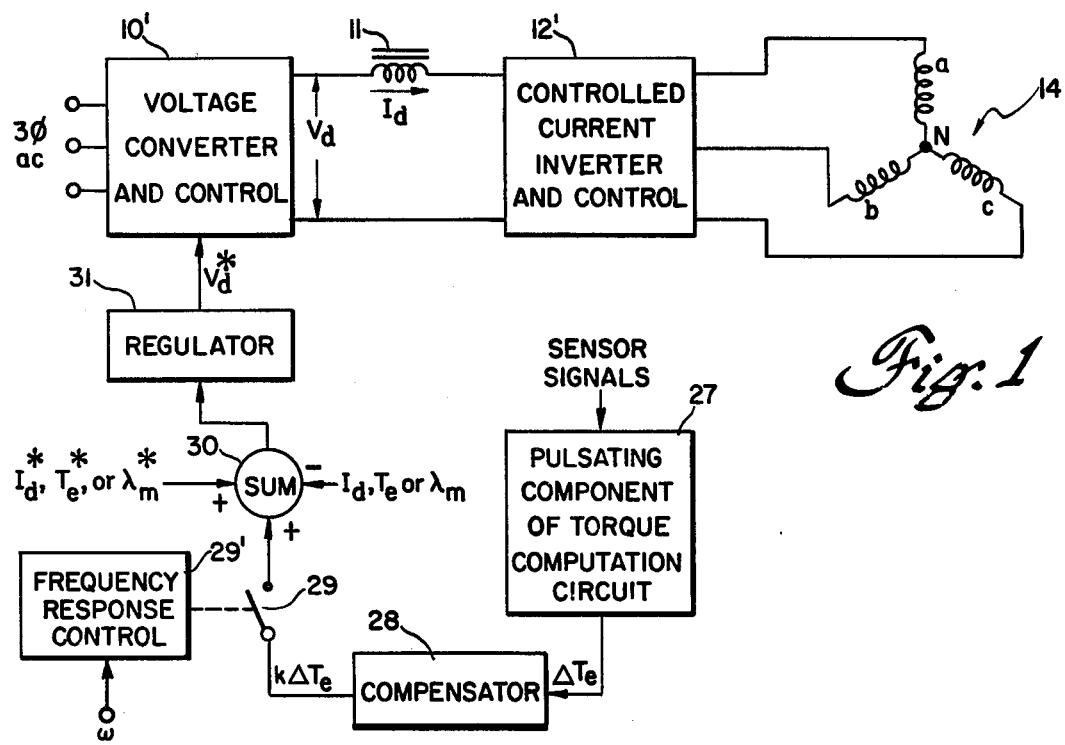
FIG. 1 is a schematic block diagram of a controlled current ac motor drive with provision for the reduction of cogging torque using a change of instantaneous torque feedback signal.

The adjustable speed, current source inverter ac motor drive system in FIG. 1 has a control system with an improved decogging feedback control for substantially eliminating (a 20:1 reduction is possible) the cogging or harmonic component of electromagnetic torque. The actual torque developed by the ac motor contains both a dc level (the shaft or useful torque) and an ac level (the cogging or pulsating torque). The decogging feedback variable according to this invention is a change of instantaneous electromagnetic torque signal, i.e., a feedback signal that is a function of only the instantaneous pulsating component of torque and from which any average torque or dc component has been removed. The decogging control is suitable for both induction motors and synchronous motors, and in either case the motor runs smoothly at slow speeds, upon startup and slowing down to reverse its direction of rotation. The decogging feedback control is normally switched out at a low frequency, for instance 5 Hz electrical frequency, above which it is not needed so that the motor can respond properly to torque pulsations that occur under normal running conditions.

The controlled current ac motor drive is illustrated in simplified block diagram form in FIG. 1 with the addition of the decogging feedback control, and it will be understood that other details of the control system have been omitted for clarity. The motor drive is energized by a source of three-phase or single-phase ac voltage and includes an ac/dc voltage converter 10' which is connected by way of a dc link including a smoothing inductor 11 to a controlled current inverter 12'. The polyphase non-sinusoidal inverter output current has a variable frequency with the dc link current magnitude, and is fed to an adjustable speed ac motor 14. Controlling the magnitude of the voltage $V_d$ applied to the dc link by voltage converter 10' adjusts the level of dc link current $I_d$, and hence the stator current, while controlling the operating frequency of controlled current inverter 12' adjusts the stator excitation frequency. Voltage converter 10' is ordinarily a full wave phase controlled rectifier, but can also be a simple diode bridge rectifier followed by a thyristor chopper or, if a battery is the source, only the chopper. Controlled current inverter 12' is any suitable inverter such as an autosequential commutated inverter, a third harmonic auxiliary commutated inverter with one commutating capacitor, or an auxiliary impulse commutated inverter with three commutating capacitors. All of these current source inverters have six main thyristors that are fired sequentially. In the decogging feedback control, a pulsating component of torque computation circuit 27 calculates the change of instantaneous torque signal $\Delta T_e$ from preselected sensor signals representing various sensed motor or converter parameters. In one form of the computation circuit, the change of torque feedback signal is calculated directly without first calculating the actual torque developed by the motor, and in another form the actual motor torque is first computed and is then high-pass filtered to remove the dc component, leaving only the pulsating component. The change of torque feedback signal $\Delta T_e$ is processed by being fed to a compensator 28 to increase its gain and provide very high frequency compensation or attenuation. Output signal $k\Delta T_e$ is applied through a switch 29, for disconnecting the cogging torque reduction control at a frequency above which it is not needed or is ineffective, to one input of a summing circuit 30.

The change of torque feedback signal is summed with a command signal representing a command value of a selected motor parameter or variable being controlled in the slow response regulating loop, and with a signal representing the sensed value of the selected motor parameter, to generate an error signal for controlling the output voltage $V_d$ of voltage converter 10'. The controlled variable can be dc link current $I_d$, electromagnetic torque $T_e$, or mutual air gap flux $\lambda_m$, or any other quantity such as speed which requires regulation, and the command values of these variables are designated by the starred symbols and the sensed values by unstarred symbols. The error signal from summer 30 is fed to a regulator 31 at the output of which is the voltage converter command signal $V_d^*$. It will be evident that the change of torque feedback signal is employed as a correction term to the means for varying the voltage applied to the dc link by voltage converter 10', to thereby modulate the dc link current in a sense to reduce the detrimental cogging torque pulsations ideally to zero. It is desirable to open switch 29 and disconnect the decogging feedback control at a relatively low frequency above which it is not needed, for instance a pulsating torque frequency of 30 Hz which corresponds to a motor electrical frequency of 5 Hz. Torque pulsations occur at normal motor speeds such as when there is a step change in load, and these torque pulsations would result in a change of torque signal that is fed back in a sense to defeat fast response by the motor to the rapid change in torque.

Switch 29 or its solid state equivalent is operated automatically by a frequency response control 29' upon the increase or decrease of an input feedback signal $\omega$ to a predetermined frequency. The input signal is preferably a signal with a frequency corresponding to the inverter switching frequency, i.e., the frequency at which gating circuit 13 in FIG. 2 supplies firing pulses to inverter 12. At a switching frequency of 30 Hz the switch is opened or closed depending upon whether the motor is picking up speed or losing speed. It is also possible to sense the fundamental frequency of the inverter output current or the mechanical shaft speed of the motor by means of a tachometer. The shaft speed is converted to the equivalent electrical frequency and the slip frequency is added or subtracted to generate the input signal $\omega$. Manual actuation of switch 29 by the operator controls may be desirable in some applications.

Figure 2:
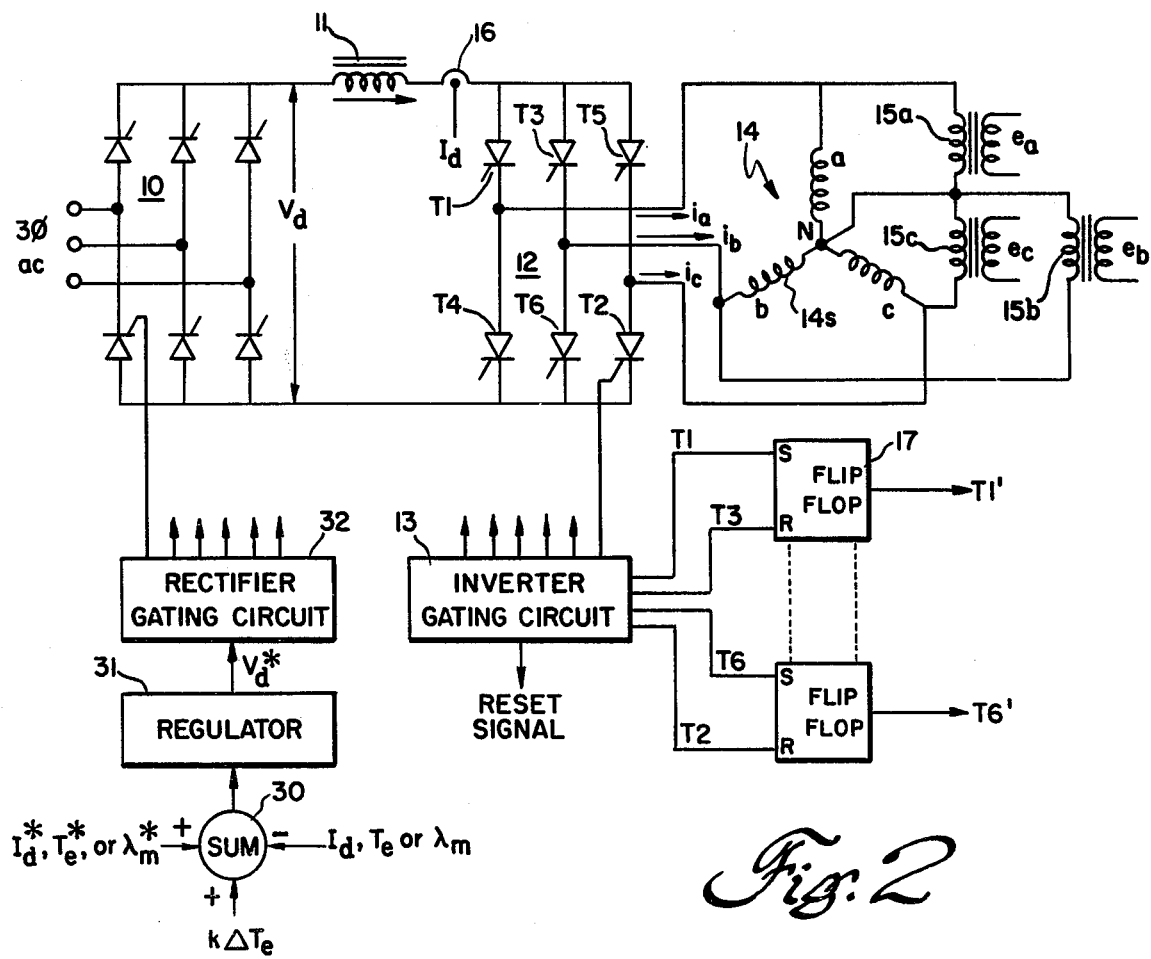
FIG. 2 is a schematic circuit diagram of a controlled current induction motor drive with the addition of sensors for computing the change of torque signal according to one embodiment.

In FIG. 2, the motor drive system in its preferred form has at the input side a phase controlled rectifier 10 energized by a three-phase, 60 Hz ac voltage source, and at the output side a controlled current polyphase thyristor bridge inverter 12 such as the improved autosequential commutated inverter disclosed in U.S. Pat. No. 3,980,941 to R. F. Griebel, assigned to the assignee of this invention, the disclosure of which is incorporated herein by reference. An inverter gating circuit 13 of conventional design generates gating signals to sequentially fire thyristors T1–T6 in the order of their numbering. The commutation details are not shown, but in the autosequential commutated inverter, a conducting thyristor is turned off by means of the parallel capacitor commutation mechanism upon supplying a gating pulse to the next thyristor in sequence in the positive bank or negative bank, and blocking diodes in series with the thyristors serve to isolate the commutating capacitors from load 14, which is a three-phase induction motor or other polyphase motor. This inverter has the capability of commutating under light load, permits motor reversing by reversing the phase sequence, and is capable of regenerative operation under braking mode conditions to return power to the supply provided that phase controlled rectifier 10 is operated as a line commutated inverter. In this drive configuration, $V_d^*$ is the rectifier command signal for gating circuit 32 to determine the firing angle of the rectifier SCR's.

Figure 4:
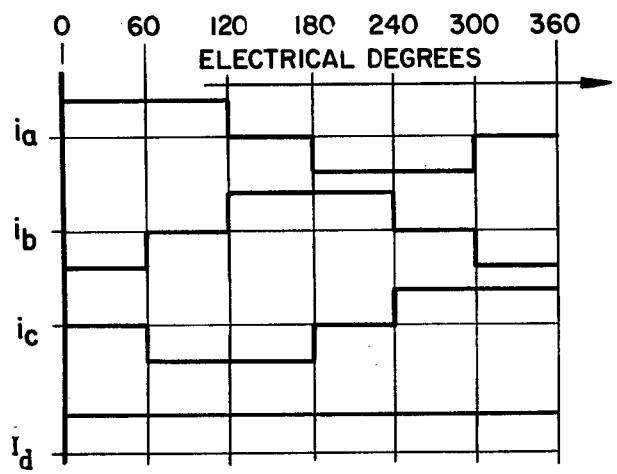
FIG. 4 illustrates idealized inverter current waveforms assuming the dc link current is constant.

FIG. 4 illustrates the idealized three-phase nonsinusoidal inverter output currents $i_a$, $i_b$, and $i_c$ assuming that the dc link current $I_d$ is constant. The stator current supplied to each phase winding 14s of the induction motor, of course, corresponds to the inverter output current and has the same magnitude as the dc link current $I_d$, since in effect the inverter thyristors operate to switch the dc link current among the three output lines. The output current in each phase ideally has a rectangular waveshape with a 120° duration in each half-cycle, neglecting commutation. Since the per phase rectangular wave output currents are 120° displaced from one another, at any moment two stator windings 14s are conducting while the remaining phase is open-circuited. The combination of conducting and open-circuited phases changes every 60° or six times per cycle. Since the motor current is 120° square or rectangular wave, because of the phase-to-phase commutation, the fifth and seventh harmonics of the motor frequency are present in the motor current in addition to the fundamental motor frequency, and also the eleventh and thirteenth harmonics, and so on. Some harmonics, including the third, ninth, and fifteenth harmonics, are eliminated by the inverter configuration, and it will be realized that the higher order harmonics do not present as much of a problem because of their small magnitudes. The reverse phase sequence fifth harmonic and the forward phase sequence seventh harmonic interact with the fundamental to produce a sixth harmonic torque component in the motor's developed torque, and in similar fashion the eleventh and thirteenth harmonics interact to produce a twelfth harmonic torque component, and so on. For a six pulse inverter, the order of these harmonic or cogging torques is given by an integral multiple of the number of pulses. The cogging torque pulsations are objectionable at very low frequencies because it is at these low frequencies that the machine can respond to the harmonics in the motor current; by modulating the dc link current $I_d$, the harmonic pulsations are substantially eliminated.

Figure 3:
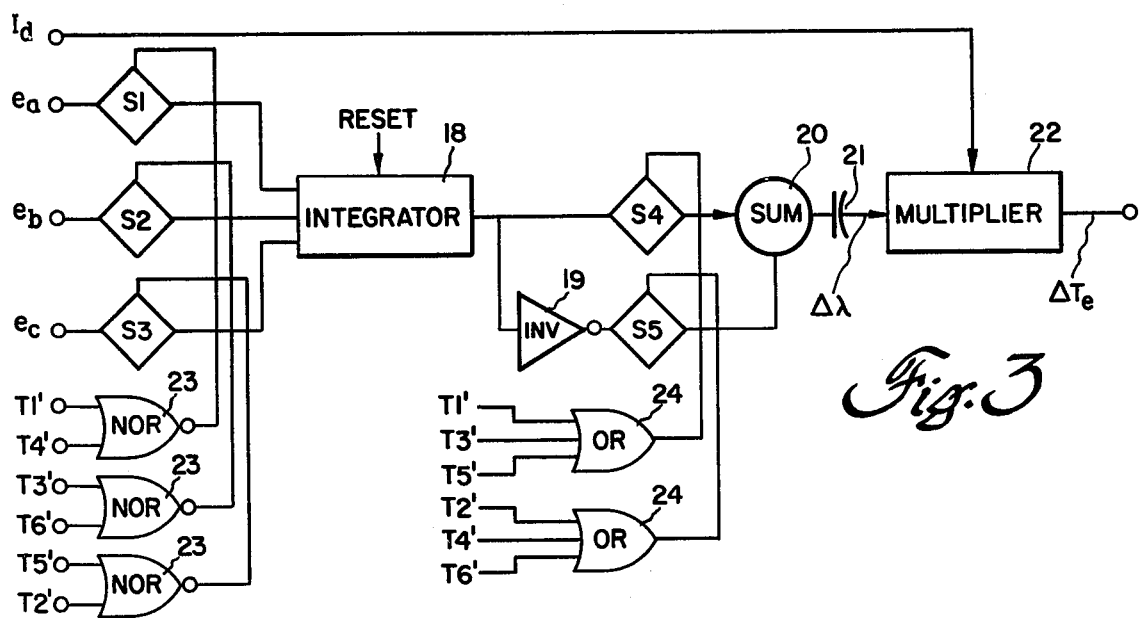
FIG. 3 is a block diagram of the pulsating component of torque computation circuit associated with FIG. 2.
Figure 5:
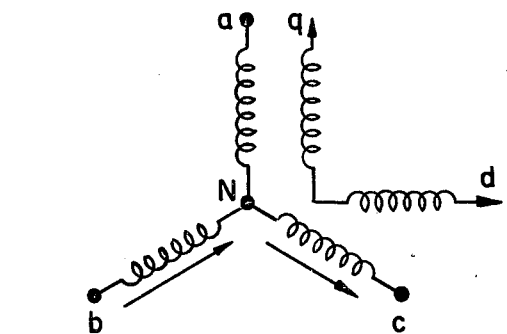
FIG. 5 is a sketch associated with a theoretical explanation of torque calculation, showing the three-phase stator windings of an induction motor and the equivalent two-phase windings along the direct (d) and quadrature (q) axes.

The torque measuring system in FIGS. 2 and 3 for generating the change of torque signal $\Delta T_e$ calculates only the pulsating or cogging component of torque, is exact and independent of changes in motor parameters, and does not require additional search or flux coils in the machine. For further information, reference may be made to concurrently filed allowed application Ser. No. 817,625 by the inventor, entitled "Measurement of Pulsating Torque in a Current Source Inverter Motor Drive," and assigned to the assignee of this invention. Before giving the equation for electromagnetic torque and explaining the theoretical basis for calculating the feedback signal, it is mentioned briefly that analysis of the steady state and transient performance of a balanced three-phase induction motor is simplified by transforming the three-phase ac quantities into equivalent two-phase variables along two perpendicular axes, referred to as the direct (d) axis and the quadrature (q) axis. Thus, in FIG 5, the wye-connected three-phase stator winding of an induction motor, assuming that phase winding a is open-circuited while phase windings b and c are conducting current, can be replaced by two mutually perpendicular phase windings along the d and q axes.

Figure 7:
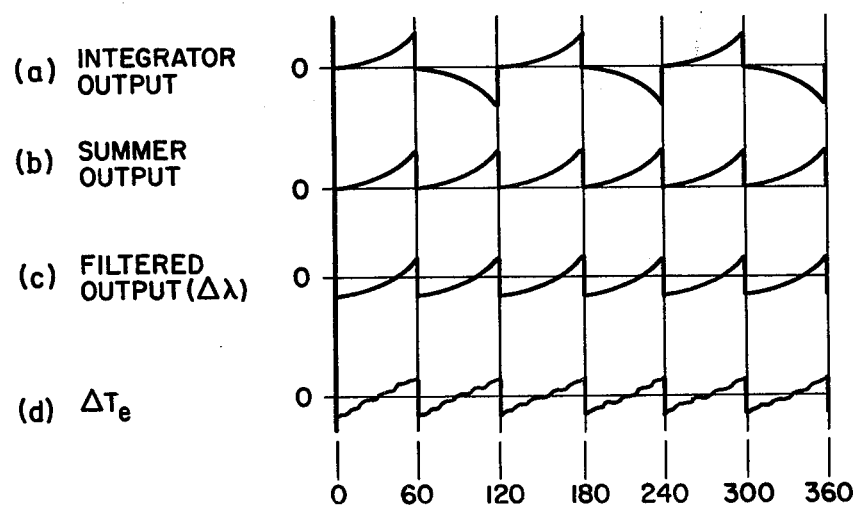
FIGS. 7a-7d show the flux signal waveforms at several points in the computation circuit of FIG. 3 and the change of torque signal at the output.
Figure 6:
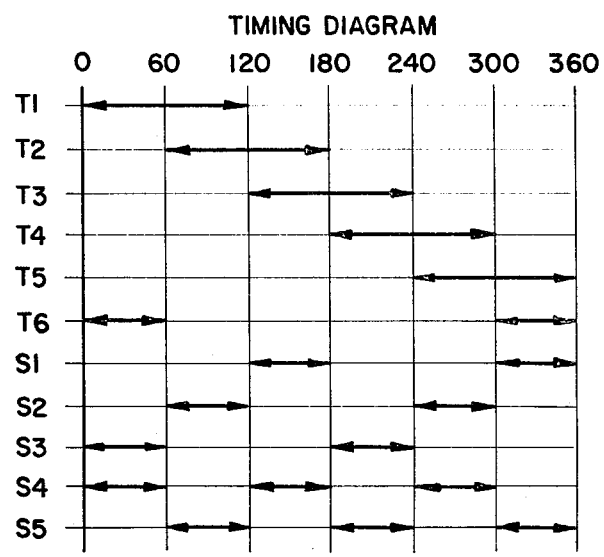
FIG. 6 is a timing diagram for the inverter thyristors in FIG. 2 and switches in FIG. 3.

In per unit, the instantaneous electromagnetic torque can be expressed by the relation $$T_e = \lambda_{md} i_{qs} - \lambda_{mq} i_{ds}, \quad (1)$$

where $\lambda_{md}$ and $\lambda_{mq}$ are the d and q axes air gap flux linkages mutually linking the stator and rotor windings, and $i_{qs}$ and $i_{ds}$ are the q and d axes stator currents. Although equation (1) is valid for the synchronously rotating or any rotating reference frame, it is valid in particular when the reference frame is stationary. That is, $$T_e = \lambda_{md}{}^s i_{qs}{}^s - \lambda_{mq}{}^s i_{ds}{}^s, \quad (2)$$

where the superscript s denotes the stationary reference frame. It can be shown that in this reference frame, the d-axis can be located in the axis of maximum current, i.e., maximum MMF. In a current source inverter motor drive, one of the inverter output phases is conducting positive current, one phase is conducting negative current, and one phase is "floating" or not conducting. Over a typical interval, for instance, over the 300° to 360° interval of FIGS. 4, 6, and 7, $i_a = 0$, $i_b = -I_d$, and $i_c = I_d$. If the q axis is now aligned with phase a as in FIG. 5, it can be determined that $$i_{ds}{}^s = I_d, \quad (3)$$

where $I_d$ is the dc link current. In this case, the current in the axis normal to this direction, namely the q-axis, is identically zero or $$i_{qs}{}^s = 0. \quad (4)$$

Substituting equations (3) and (4) into (2), $$T_e = -\lambda_{mq}{}^s i_{ds}{}^s = -\lambda_{mq}{}^s I_d. \quad (5)$$

Equation (5) indicates a means of calculating the instantaneous pulsating component of electromagnetic torque. By definition, the q-axis is located in the direction of zero stator current, then by definition, the stator current component in the d-axis (normal to the q-axis) is $I_d$. In general, one of the three stator phases is always zero so that the open circuit voltage across this phase is the time derivative of the flux in this axis. Integration of this open circuit voltage yields the q-axis flux which when multiplied with the q-axis current, i.e., the dc link current, yields the torque.

A simpler, intuitive explanation of the calculation is as follows. At any one time, changing at 60° intervals, two phase windings are conducting and the current in the other is zero. When the current in a phase winding is zero, there is a sinusoidal voltage impressed across the winding which corresponds to the air gap voltage. The integral of this voltage is the motor air gap flux. Instantaneous torque is the product of the mutually perpendicular air gap flux and stator current, where the stator current corresponds to the dc link current. This technique computes only the instantaneous pulsating component of torque, and does not compute average torque because the point of starting the integration is a function of the inverter thyristor switching and is arbitrary. The shape of the integral is the pulsating component, however, and is independent of the average value of torque.

The sensed information needed to calculate the instantaneous pulsating component of electromagnetic torque by means of the computation circuit in FIG. 3 is indicated in FIG. 2. The instantaneous sinusoidal voltage across an open-circuited phase winding is sensed at the motor terminals and requires bringing out the neutral N. Transformers 15a, 15b, and 15c are connected between the appropriate motor terminals and generate signals $e_a$, $e_b$, and $e_c$. The magnitude of the stator current and the zero current intervals in each motor phase winding can be measured directly from the inverter output current, but it is more convenient to sense the level of dc link current $I_d$, using any suitable sensor 16, and to process the inverter thyristor gating pulses to generate signals representative of the zero current intervals. Motor phase winding a is supplied with current whenever either of series-connected thyristors T1 and T4 is conductive, and there is a 60° period in each half cycle when the current is zero (also see the timing diagram of FIG. 6). To generate a signal, hereafter designated T1', corresponding to the conduction interval of thyristor T1, the gate pulse for T1 is fed to the set input, and the gate pulse for T3 to the reset input, of a flip-flop or latch 17. In similar fashion, pairs of gate pulses, one indicating turn-on of the device and the other the initiation of turn-off by the parallel commutation mechanism, are fed to a series of flip-flops to generate the signals T2'-T6'.

As was mentioned, there is a sinusoidal voltage across a phase winding during the zero current interval which corresponds to the motor air gap voltage, and the integral of this voltage is the air gap flux. By multiplying the dc link current $I_d$ by flux, the pulsating component of torque is computed but not the average value. Phase winding voltages $e_a$, $e_b$, and $e_c$ are applied, respectively, through switches S1, S2, and S3 to an integrator 18 which is reset after each commutation by means of a reset signal derived in inverter gating circuit 13. The opposite polarity air gap flux signals are fed directly through a switch S4, or through an inverter gate 19 and switch S5, to a summing circuit 20. The summed flux signals are high pass filtered in a capacitor 21 (or its operational equivalent) to remove the dc portion of the signal, and the filtered flux signals ($\Delta\lambda$) are multiplied with dc link current $I_d$ in a multiplier 22. The circuit output is the pulsating component of electromagnetic torque or change of torque signal $\Delta T_e$. FIGS. 7a-7d illustrate the waveforms at several stages in the computation circuit. The flux signal at the integrator output is a cosine function, and changes polarity at 60° intervals as the integrator is reset. The sinusoidal instantaneous phase winding voltages are successively integrated during the interval the current in that phase winding is zero. At the summer output the flux signals have the same polarity, and high pass filtering the flux signals rejects the dc component. If the dc link current $I_d$ is modulated rather than being constant, the modulation also shows up in the pulsating component of torque signal $\Delta T_e$.

In FIG. 3, signals T1' and T4' are applied to a NOR logic gate 23, which produces an output closing switch S1 during the nonconducting intervals of thyristors T1 and T4 when phase winding a is open-circuited. The timing diagram in FIG. 6 clarifies the operation. Switch S2 for gating voltage $e_b$ to the integrator, and switch S3 for gating voltage $e_c$, are controlled in the same manner by other NOR gates. At the integrator output, signals T1', T3', and T5' are the inputs to an OR logic gate 24, so that switch S4 is closed by a conduction of thyristors supplying positive polarity currents to the motor phase windings. Switch S5 associated with inverter gate 19 is closed, on the other hand, by the conduction of thyristors supplying negative polarity currents to the phase windings. In the case that the gating pulses are coextensive with the conduction of the thyristors, it will be recognized that the gating pulses can be applied directly to NOR gates 23 and OR gates 24. Integrator 18, summer 20, and multiplier 22 are preferably implemented by operational amplifier circuitry, but any conventional components can be used.

Figure 8:
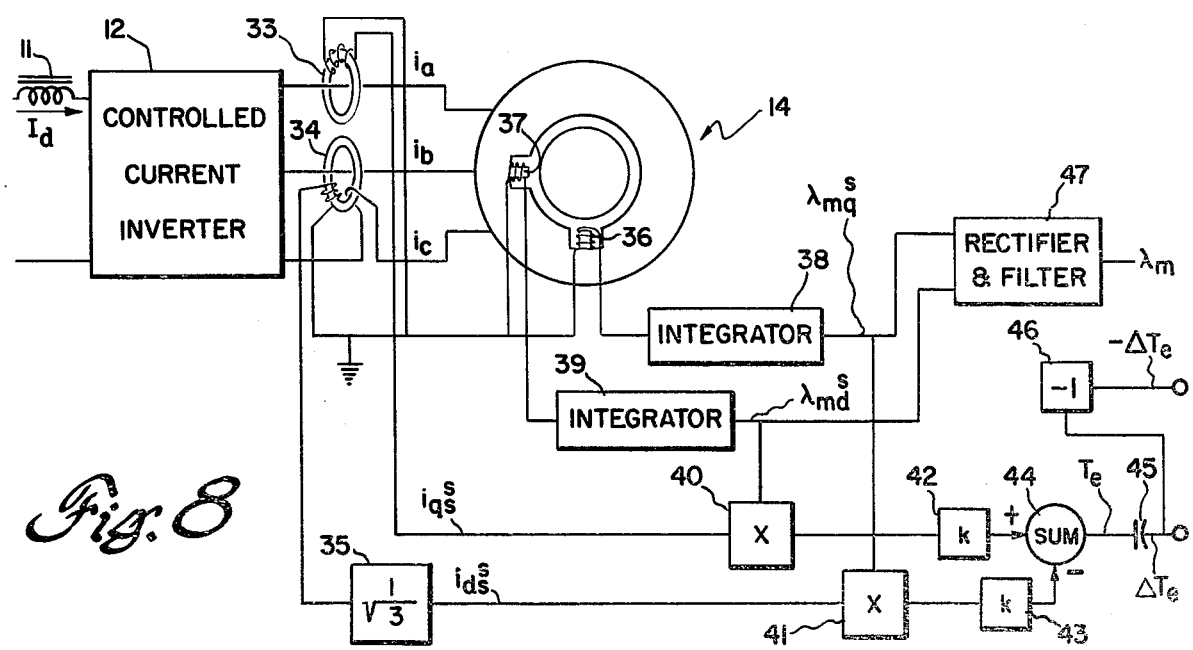
FIG. 8 is a schematic diagram of another embodiment of a torque measuring system for calculating actual motor torque and deriving therefrom the change of torque feedback signal.

The change of instantaneous torque feedback signal $\Delta T_e$ is also derived by measuring the actual torque developed by the motor and filtering to reject the dc component. One basic scheme is shown in FIG. 8. In this implementation, the d-q axis currents are computed as $$i_{qs}^s = i_{as} \tag{6}$$

$$i_{ds}^s = (i_{cs} - i_{bs})/\sqrt{3} \tag{7}$$

The d-q axis air gap fluxes are computed by locating search coils in the effective d-q axes of the machine. The coils may be concentrated around one tooth or distributed in order to eliminate voltages due to saturation and rotor tooth harmonics. The search coils produce a voltage which is then integrated to produce the two flux signals. Having computed the current and flux signals, the torque is then calculated by means of the equation $$T_e = (3/2)(P/2)(\lambda_{md}^s i_{qs}^s - \lambda_{mq}^s i_{ds}^s), \tag{8}$$

where P is the number of poles.

The current signals in Equations (6) and (7) are generated by current transformers 33 and 34, both having secondary windings with N turns; in the latter, the two single turn primary windings are in the opposing sense and the output signal $i_{cs} - i_{bs}$ is passed through a proportional gain circuit 35. Search coils 36 and 37 are located in the effective d and q axes of the machine wound about one or more stator teeth, and generate voltages proportional to air gap flux which are integrated by integrators 38 and 39 to provide a d-axis and a q-axis flux signal. To calculate the electromagnetic torque $T_e$ according to Equation (8), multipliers 40 and 41 respectively have the indicated current and flux signal inputs, and the products are passed through gain circuits 42 and 43 and then algebraically added in a summer 44. The average torque or dc component of signal $T_e$ is rejected by a high pass filter capacitor 45 (or its operational equivalent), leaving only the pulsating component of torque or change of instantaneous torque signal $\Delta T_e$. For braking mode operation, it is necessary to change the polarity of $\Delta T_e$ by means of an inverter 46. To generate flux amplitude signal $\lambda_m$, a rectifier and filter circuit 47 has as inputs $\lambda_{mq}^s$ and $\lambda_{md}^s$. The search coils and integrators may be as taught in U.S. Pat. No. 4,011,489 to J. P. Franz and A. B. Plunkett, assigned to the assignee of this invention.

The circuitry for calculating torque signal $T_e$ in FIG. 8 is the claimed subject matter of U.S. Pat. No. 4,023,083 to A. B. Plunkett, entitled "Torque Regulating Induction Motor System," assigned to the same assignee as this invention, the disclosure of which is incorporated herein by reference. In that patent, however, the torque measuring circuit includes means for smoothing out torque ripple so that an average value of torque feedback signal is derived. In the present invention a high pass filter is used to derive the change of torque signal $\Delta T_e$ which is fed back in such manner as to regulate this quantity to zero.

An exemplary application of the cogging torque reduction control and method is its addition to the controlled current a-c motor drive described and claimed in allowed patent application Ser. No. 729,042 filed on Oct. 4, 1976 by J. D. D'Atre, T. A. Lipo, and A. B. Plunkett, now U.S. Pat. No. 4,088,934, for "Means for Stabilizing an AC Electric Motor Drive System," assigned to the same assignee as this invention. In this control strategey the frequency of the stator excitation is controlled as a function of the torque angle feedback signal. Torque regulation is entirely in a fast response regulating loop for determining the operating frequency of the controlled current inverter and therefore the fundamental stator excitation frequency. The command signal in the slow response regulating loop for determining the rectifier output voltage, and therefore the level of dc link current, can take various forms and is illustrated as representing a desired magnitude of stator excitation. With the addition of the decogging feedback control, the change of instantaneous torque feedback signal is summed with the command signal excitation magnitude or alternatively with a signal representing the error between desired and actual magnitudes of excitation and the resulting signal is processed by a regulator and fed to a rectifier gate pulse generator to control the rectifier output voltage $V_d$ applied to the dc link.

In the absence of the change of torque feedback signal described herein, there are large cogging torques, especially as the machine approaches zero speed. With the feedback signal, on the other hand, the pulsating component of torque is greatly diminished although the net system performance is substantially the same. As was explained in the discussion of FIG. 1, switch 29 is opened at a pulsating torque frequency of about 30 Hz, because the detrimental cogging torque pulsations are not present at higher speeds and by disconnecting the change of torque feed-back signal the motor drive system makes the proper response to torque pulsations occurring at the higher motor speeds. Signal $\Delta T_e$ is, of course, generated at the higher motor speeds and would be fed back unless switched out and interact with the torque regulating loop in a detrimental manner.

While the invention has been particularly shown and described with reference to several preferred embodiments thereof, it will be understood by those skilled in the art that various changes and form and details may be made therein without departing from the spirit and scope of the invention.

The invention claimed is:

1. In a control system for a controlled current motor drive comprising a voltage converter which is connected by way of a dc link including a smoothing inductor to a controlled current inverter for producing output current with the dc link current magnitude and a variable frequency to be fed to an ac motor, the control system including means for varying the magnitude of the voltage applied to the dc link by said voltage converter, improved means for reducing cogging torque in said motor comprising means for generating a change of instantaneous torque feedback signal that is a function of only the instantaneous pulsating component of electromagnetic torque and which has no dc component, and
means for providing said change of torque feedback signal as a correction term to said means for varying the magnitude of the voltage applied to the dc link to thereby effect a reduction in cogging torque pulsations.

2. The combination according to claim 1 further including switch means for disconnecting said change of torque signal in response to the switching frequency of said inverter increasing to at least a predetermined low frequency above which a decogging feedback control is not needed.

3. The combination according to claim 2 wherein said means for generating a change of torque feedback signal comprises means coupled to the motor for producing a signal indicative of the instantaneous torque actually developed by the motor, and means for filtering said actual torque signal to remove the dc component.

4. The combination according to claim 1 wherein said means for generating a change of torque feedback signal comprises means coupled to the motor for producing a signal indicative of the instantaneous torque actually developed by the motor, and means for filtering said actual torque signal to remove the dc component, means for generating a signal representing the sensed value of a selected motor parameter to be controlled,
said means for providing said change of torque signal as a correction term to said voltage varying means comprising means for summing said change of torque signal with a signal representing a command value of the selected motor parameter and said signal representing the sensed value of the selected motor parameter to thereby generate an error signal for controlling said voltage converter and the output voltage thereof, and
switch means for disconnecting and connecting said change of torque signal at a predetermined low frequency above which a decogging feedback control is not needed.

5. The combination according to claim 1 wherein said means for generating a change of torque feedback signal comprises means coupled to the motor for producing a signal representing sensed air gap flux and a signal indicative of the instantaneous torque actually developed by the motor, and means for filtering said actual torque signal to remove the dc component, said means for providing said change of torque signal as a correction term to said voltage varying means comprising means for summing said change of torque signal with a signal representing a command value of motor air gap flux and said signal representing sensed air gap flux to thereby generate an error signal for controlling said voltage converter and the output voltage thereof.

6. The combination according to claim 1 wherein said means for generating a change of torque feedback signal comprises means coupled to the motor for producing a signal indicative of the instantaneous torque actually developed by the motor, and means for filtering said actual torque signal to remove the dc component, said means for providing said change of torque signal as a correction term to said voltage varying means comprising means for summing said change of torque signal with a signal representing a command value of actual motor torque and the signal representing sensed actual motor torque to thereby generate an error signal for controlling said voltage converter and the output voltage thereof.

7. In a control system for a controlled current motor drive comprising a voltage converter which is connected by way of a dc link including a smoothing inductor to a controlled current polyphase bridge inverter for producing output current with the dc link current magnitude and a variable frequency to be fed to an ac motor, the control system including means for varying the magnitude of the voltage applied to the dc link by said voltage converter, improved means for reducing cogging torque in said motor comprising means for generating sensor signals effectively representing the amplitude of the current fed to the motor phase windings, the zero current intervals in each phase winding, and the instantaneous voltage across each phase winding, a computation circuit for processing said sensor signals and deriving a change of instantaneous torque feedback signal that is a function of only the instantaneous pulsating component of electromagnetic torque and which has no dc component, and means for providing said change of torque feedback signal as a correction term to said means for varying the magnitude of the voltage applied to the dc link to thereby effect a reduction in the cogging torque pulsations.

8. The combination according to claim 7 further including switch means for disconnecting and connecting said change of torque signal at a frequency above which a decogging feedback control is not needed.

9. In a control system for a controlled current motor drive comprising a voltage converter which is connected by way of a dc link including a smoothing inductor to a controlled current inverter for producing output current with the dc link current magnitude and a variable frequency to be fed to an ac motor, the control system including means for varying the magnitude of the voltage applied to the dc link by said voltage converter, an improved method for reducing cogging torque in said motor comprising sensing the dc link current, the zero current intervals in each motor phase winding, and the instantaneous voltage across each open-circuited phase winding and deriving therefrom a feedback signal that is a function of only the instantaneous pulsating component of electromagnetic torque and which has no dc component, providing said feedback signal as a correction term to said means for varying the magnitude of the voltage applied to the dc link to thereby effect a reduction in cogging torque pulsations, and switching out said feedback signal at a predetermined low frequency above which a decogging feedback control is not needed.

* * * * *